(12) United States Patent
Yoshida, II et al.

(10) Patent No.: US 11,668,364 B2
(45) Date of Patent: Jun. 6, 2023

(54) GAS CUP FOR A DAMPER ASSEMBLY AND A DAMPER ASSEMBLY

(71) Applicant: BeijingWest Industries Co., Ltd., Beijing (CN)

(72) Inventors: Shigekata Yoshida, II, Kettering, OH (US); Eric Schumann, Kettering, OH (US); Timothy Schlangen, Kettering, OH (US); Michael Zimmerman, Kettering, OH (US)

(73) Assignee: BEIJINGWEST INDUSTRIES CO., LTD, Beijing (CN)

( * ) Notice: Subject to any disclaimer, the term of this patent is extended or adjusted under 35 U.S.C. 154(b) by 248 days.

(21) Appl. No.: 17/105,474

(22) Filed: Nov. 25, 2020

(65) Prior Publication Data

US 2022/0163085 A1 May 26, 2022

(51) Int. Cl.
 *F16F 9/08* (2006.01)
 *F16F 9/06* (2006.01)
 (Continued)

(52) U.S. Cl.
 CPC ............. *F16F 9/088* (2013.01); *F16F 9/061* (2013.01); *F16F 9/064* (2013.01); *F16F 9/48* (2013.01);
 (Continued)

(58) Field of Classification Search
 CPC .. F16F 9/061; F16F 9/088; F16F 9/067; F16F 9/48; F16F 9/064; F16F 2224/025;
 (Continued)

(56) References Cited

U.S. PATENT DOCUMENTS

| | | | | |
|---|---|---|---|---|
| 2,774,446 | A | * | 12/1956 | Bourcier De Carbon ................... F16F 9/061 267/221 |
| 3,121,479 | A | * | 2/1964 | Dülenburger ........... F16F 9/088 92/60 |

(Continued)

FOREIGN PATENT DOCUMENTS

| | | |
|---|---|---|
| DE | 1926000 A1 | 11/1969 |
| DE | 2123679 B1 | 9/1972 |

(Continued)

OTHER PUBLICATIONS

First Office Action issued for corresponding Japanese Patent Application 2021-100536 dated May 10, 2022.

(Continued)

*Primary Examiner* — Robert A. Siconolfi
*Assistant Examiner* — James K Hsiao
(74) *Attorney, Agent, or Firm* — William H. Honaker; Dickinson Wright PLLC (57) ABSTRACT

A gas cup for a damper assembly comprises a body including an upper surface, a lower surface, an exterior surface and an interior surface. The body defines an aperture extending through the upper surface and the lower surface. A decoupler is located in the aperture and secured to the body. A bridging member is located between the decoupler and the body and coupled to the decoupler and the body. The decoupler and the bridging member is made from materials having different elasticity to allow the decoupler to move in the aperture in response to a volumetric change in the damper assembly and to provide variable tuning of the damper assembly. A damper assembly including the gas cup is also disclosed herein.

19 Claims, 6 Drawing Sheets

(51) Int. Cl.
*B60G 13/08* (2006.01)
*B60G 17/08* (2006.01)
*F16F 9/088* (2006.01)
*F16F 9/48* (2006.01)

(52) U.S. Cl.
CPC .............. *B60G 13/08* (2013.01); *B60G 17/08* (2013.01); *B60G 2202/24* (2013.01); *B60G 2204/62* (2013.01); *B60G 2206/41* (2013.01); *B60G 2206/7102* (2013.01); *B60G 2206/73* (2013.01); *B60G 2500/10* (2013.01); *B60G 2600/21* (2013.01); *B60G 2800/162* (2013.01); *F16F 2222/12* (2013.01); *F16F 2224/025* (2013.01); *F16F 2224/0208* (2013.01); *F16F 2228/066* (2013.01); *F16F 2230/007* (2013.01); *F16F 2232/08* (2013.01); *F16F 2234/02* (2013.01)

(58) Field of Classification Search
CPC .... F16F 9/08; F16F 2230/007; F16F 2232/08; F16F 2228/066; F16F 2222/12; F16F 2234/02; F16F 2224/0208; B60G 2600/21; B60G 2202/24; B60G 2204/62; B60G 17/08; B60G 2800/162; B60G 2206/73; B60G 2206/7102; B60G 2500/10; B60G 2206/41; B60G 13/08
USPC .......................................................... 188/269
See application file for complete search history.

(56) References Cited

U.S. PATENT DOCUMENTS

| | | | | | |
|---|---|---|---|---|---|
| 3,164,381 | A | * | 1/1965 | Tuczek | F16F 9/067 188/269 |
| 3,224,345 | A | * | 12/1965 | Doetsch | F16F 9/088 92/99 |
| 3,307,842 | A | * | 3/1967 | Ellis, Jr. | F16F 9/48 267/128 |
| 3,587,789 | A | * | 6/1971 | Keilholz | F16F 9/088 188/269 |
| 4,789,192 | A | * | 12/1988 | Warner | B60R 19/32 267/116 |
| 4,880,213 | A | * | 11/1989 | Shinbori | F16F 9/088 92/48 |
| 5,174,552 | A | * | 12/1992 | Hodgson | B64D 27/26 188/282.3 |
| 5,257,680 | A | * | 11/1993 | Corcoran | F16F 7/09 188/290 |
| 5,848,677 | A | * | 12/1998 | Beck | F16F 9/367 188/322.22 |
| 5,878,851 | A | * | 3/1999 | Carlson | F16F 9/3242 188/269 |
| 6,213,475 | B1 | * | 4/2001 | Schalles | F16F 9/067 277/457 |
| 6,394,240 | B1 | * | 5/2002 | Barwick | B60G 21/0553 188/293 |
| 8,955,653 | B2 | * | 2/2015 | Marking | B60G 17/08 188/269 |
| 10,525,785 | B2 | * | 1/2020 | Rose | F16F 9/04 |
| 2003/0159897 | A1 | * | 8/2003 | Oliver | F16F 9/061 188/322.19 |
| 2003/0234146 | A1 | * | 12/2003 | Grundei | F16F 9/061 188/316 |
| 2005/0023093 | A1 | * | 2/2005 | Leiphart | F16F 9/46 188/283 |
| 2006/0180418 | A1 | * | 8/2006 | Kojima | F16F 9/067 188/314 |
| 2010/0018817 | A1 | * | 1/2010 | Kim | F16F 13/268 188/269 |
| 2011/0049774 | A1 | * | 3/2011 | Naber | F16F 9/5126 267/64.27 |
| 2011/0083929 | A1 | * | 4/2011 | Marking | B60G 17/08 188/267.2 |
| 2014/0027220 | A1 | * | 1/2014 | Handke | F16F 9/3214 188/322.22 |
| 2016/0169315 | A1 | * | 6/2016 | DeBruler | F16F 9/0463 267/122 |
| 2018/0079274 | A1 | * | 3/2018 | Rose | B60G 17/0521 |

FOREIGN PATENT DOCUMENTS

| | | |
|---|---|---|
| DE | 4335327 A1 | 4/1995 |
| EP | 3299193 A2 | 3/2018 |
| JP | 58184044 U | 12/1983 |
| JP | 63110701 U | 7/1988 |

OTHER PUBLICATIONS

Extended European Search Report dated May 4, 2022 for counterpart European patent application No. 21208906.4.

* cited by examiner

GAS CUP FOR A DAMPER ASSEMBLY AND A DAMPER ASSEMBLY

BACKGROUND OF THE INVENTION

1. Field of the Invention

The present invention relates generally to a gas cup for a damper assembly and a damper assembly.

2. Description of the Prior Art

Conventional piston dampers include dampers having a tube, a piston assembly (such as a piston assembly including a piston core and a piston ring positioned outward of the piston core to define a through passageway between the piston core and the piston ring), and a piston rod. The tube contains a damping fluid. The piston assembly slideably engages the tube between the closed and open end portions of the tube. The piston rod has a first end portion attached to the piston assembly and a second end portion extending outside the open end portion of the tube. A rod guide assembly is attached to the open end portion of the tube to guide the piston rod and to seal the damping fluid within the tube. A floating, hermetically-sealing gas cup (such as one made of impermeable aluminum) slidingly engages the tube to separate the damping fluid from a gas and slides (floats) to adjust for the volume change caused by the moving piston rod, thermal expansion of the damping fluid, and normal loss of damping fluid, as is known to those skilled in the art. The gas cup has a single seal disposed in fully-circumferential surface groove on the outwardly-facing circumferential surface of the gas cup.

One such a gas cup assembly is disclosed in German Patent Application DE2018845. The gas cup assembly includes a body having an upper surface, a lower surface, an exterior surface and an interior surface. The body defines an aperture extending through the upper surface and the lower surface of the body. A decoupler, made entirely from an elastomeric material, is located in the aperture and secured to the interior surface of the body. However, these designs tend to have durability issues caused by long-term gas leakage through large elastomeric area of the decoupler and gas permeability characteristics of the elastomeric material.

SUMMARY OF THE INVENTION

The present invention in its broadest aspect provides a gas cup which significantly reduces gas pressure loss over time. The present invention also provides a gas cup having variable tuning parameters, which improves the damping characteristics of a damper assembly and thereby improving the ride comfort of a user. The present invention also a gas cup including a decoupler having improved durability thereby increasing the operational life of the damper assembly. The present invention provides a damper assembly including the gas cup that improves ride comfort of a user, especially at high frequency inputs and small amplitude.

It is one aspect of the present invention to provide a gas cup for a damper assembly. The gas cup comprises a body including an upper surface, a lower surface, an exterior surface and an interior surface. The body defines an aperture extending through the upper surface and the lower surface. A decoupler is located in the aperture and secured to the body. A bridging member is located between the decoupler and the body and coupled to the decoupler and the body. The decoupler and the bridging member are made from materials having different elasticity to allow the decoupler to move in the aperture in response to a volumetric change in the damper assembly and to provide variable tuning of the damper assembly.

It is another aspect of the present invention to provide a damper assembly. The damper assembly comprises a housing extending along a center axis between an opened end and a closed end defining a space extending therebetween. A piston is slidably disposed in the space dividing the space into a compression chamber and a rebound chamber. A piston rod guide is located in the rebound chamber in sealing engagement with the opened end. A piston rod extends into the rebound chamber and is coupled to the piston for moving the piston in the space between a compression stroke and a rebound stroke. A gas cup includes a body slidably located in the compression chamber dividing the compression chamber into a gas compartment and a fluid compartment. The body includes an upper surface, a lower surface, an exterior surface and an interior surface. The body defines an aperture extending through the upper surface and the lower surface to allow fluid communication between the gas compartment and the fluid compartment. A decoupler is located in the aperture and secured to the body. A bridging member is located between the decoupler and the body and is coupled to the decoupler and the body. The decoupler and the bridging member are made from materials having different elasticity to allow the decoupler to move in the aperture in response to a volumetric change in the damper assembly and to provide variable tuning of the damper assembly.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
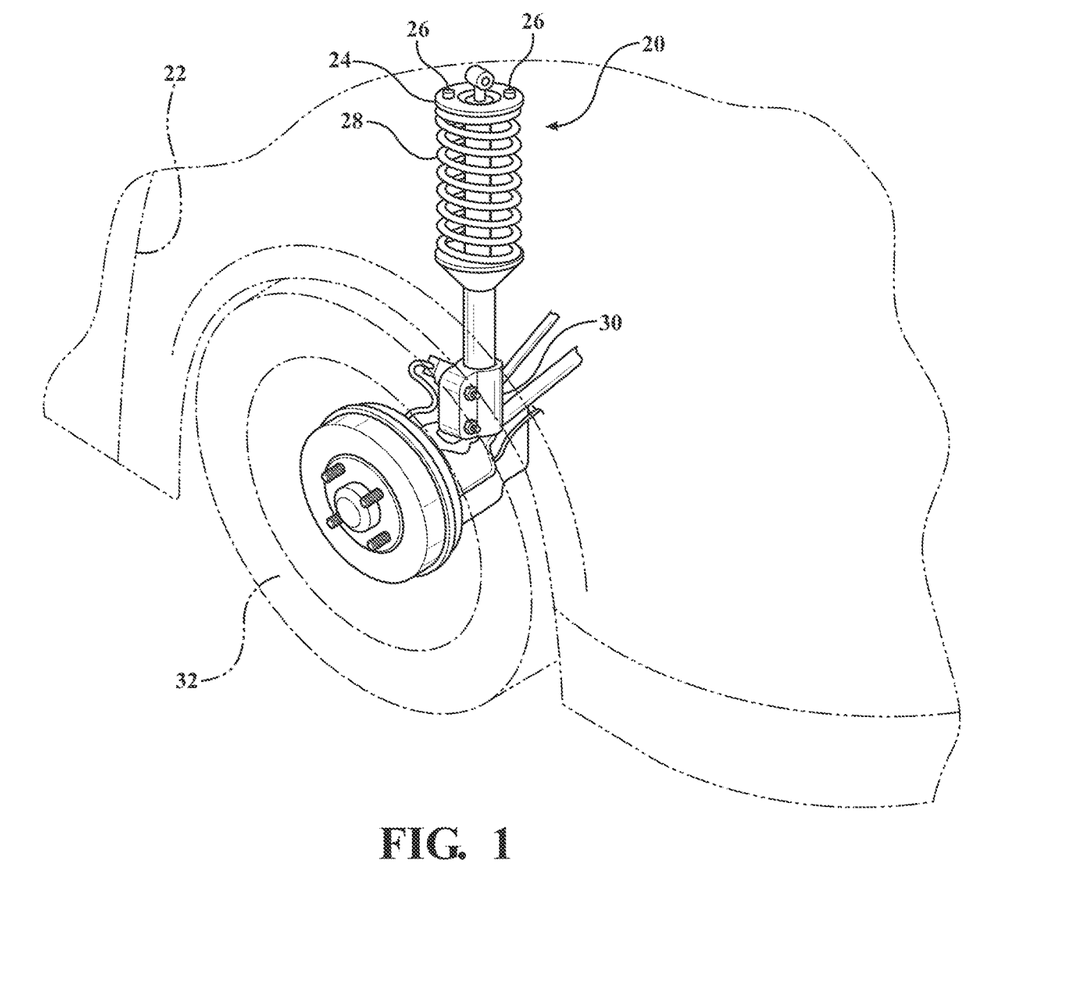
FIG. 1 is a fragmentary view of a vehicle suspension including a damper assembly constructed in accordance with an embodiment of the present invention.

Referring to the Figures, wherein like numerals indicate corresponding parts throughout the several views, a damper assembly 20 for use in a vehicle constructed in accordance with one embodiment of the present invention is generally shown in FIG. 1.

FIG. 1 illustrates a fragment of an exemplary vehicle suspension including the damper assembly 20 being attached to a vehicle chassis 22 via a top mount 24 and a number of screws 26 disposed on a periphery of an upper surface of the top mount 24. The top mount 24 connects to a coil spring 28. The damper assembly 20 connects to the steering knuckle 30 supporting vehicle wheel 32.

Figure 2:
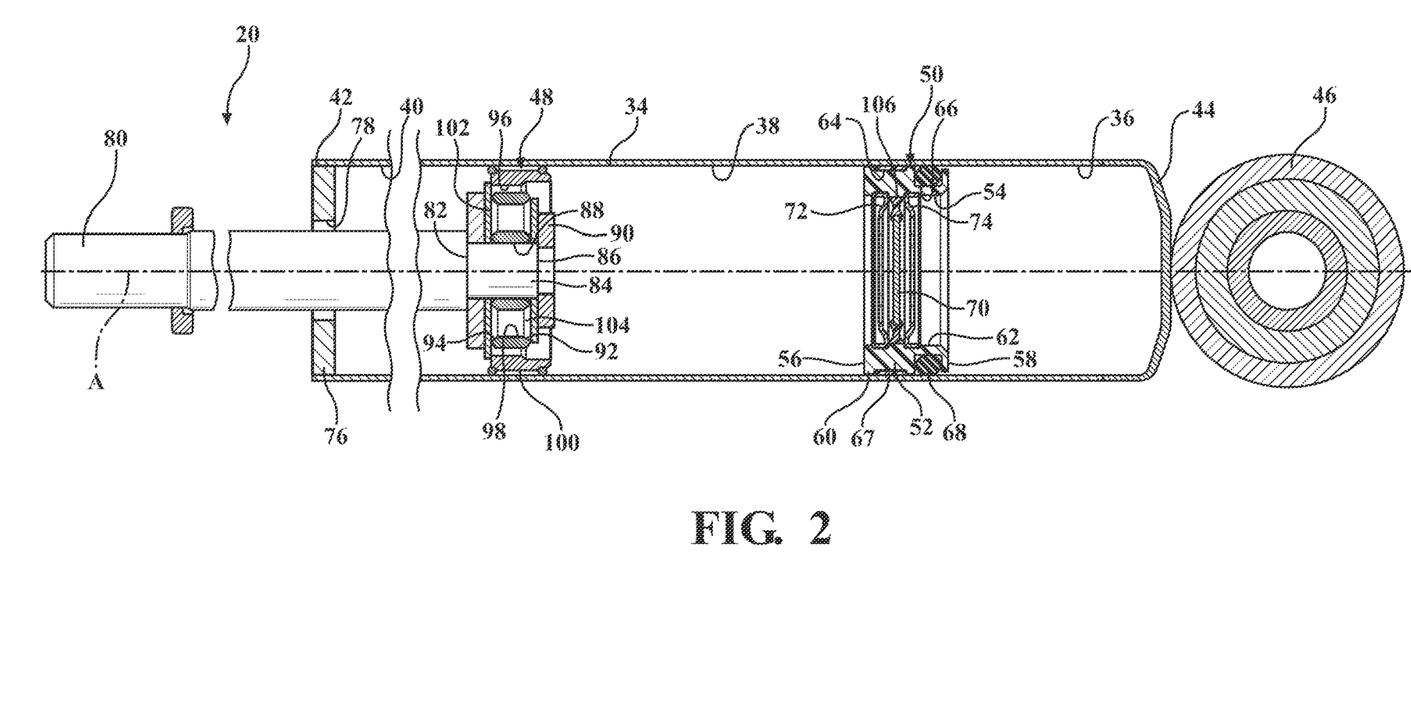
FIG. 2 is a cross-sectional perspective view of the damper assembly including a gas cup constructed according to an embodiment of the present invention.
Figure 3:
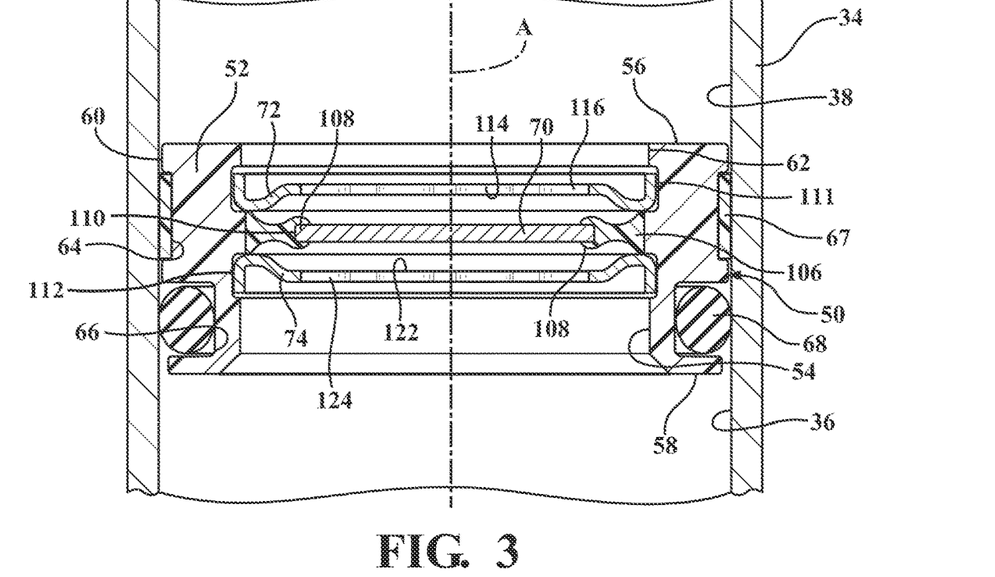
FIG. 3 is a fragmentary view of the damper assembly including the gas cup constructed according to an embodiment of the present invention.
Figure 4:
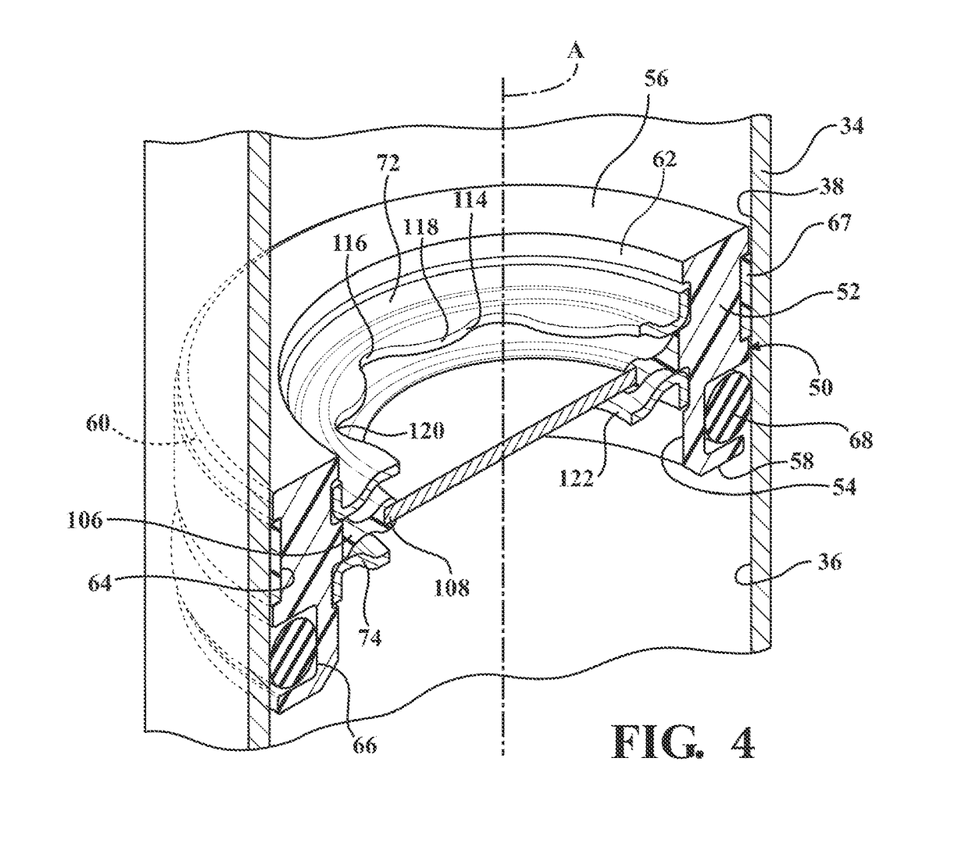
FIG. 4 is a sectional view of the damper assembly including the gas cup.
Figure 5:
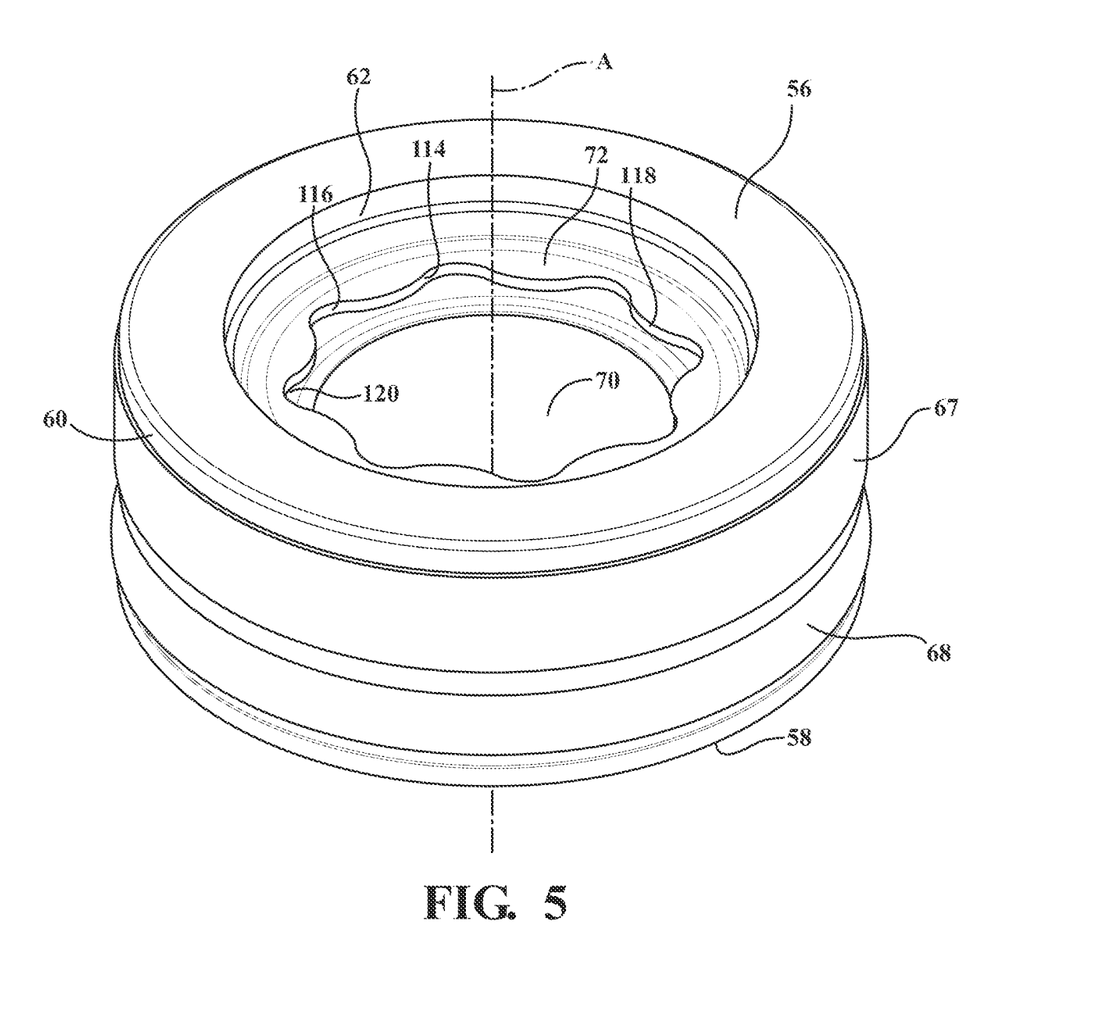
FIG. 5 is a perspective view of the gas cup.
Figure 6:
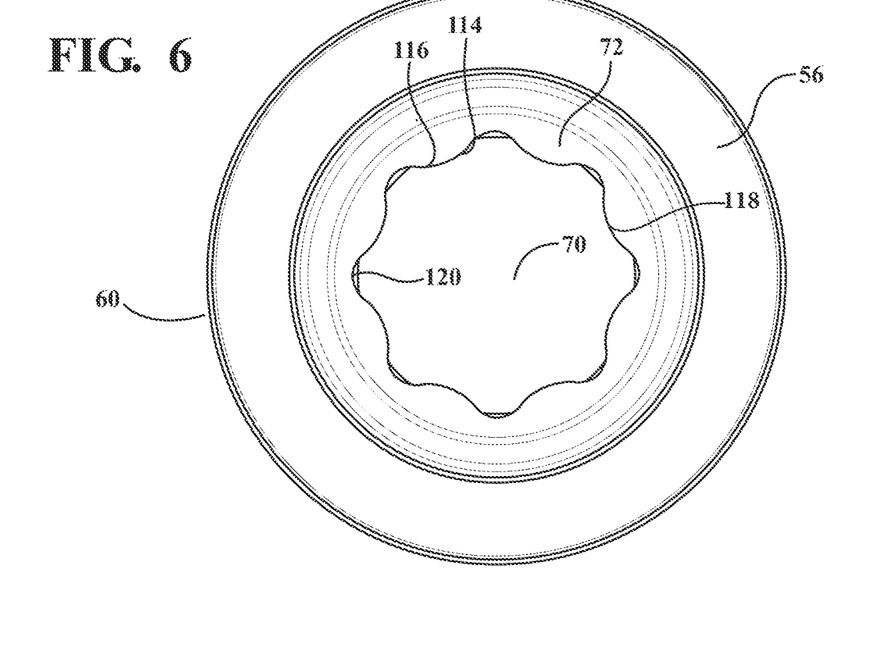
FIG. 6 is a top view of the gas cup.
Figure 7:
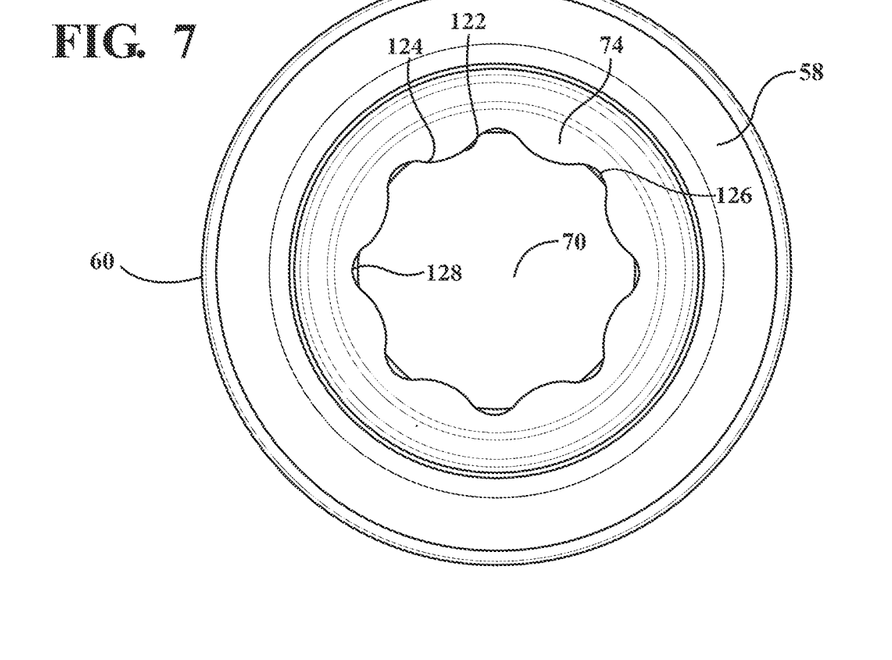
FIG. 7 is a bottom view of the gas cup.
Figure 8:
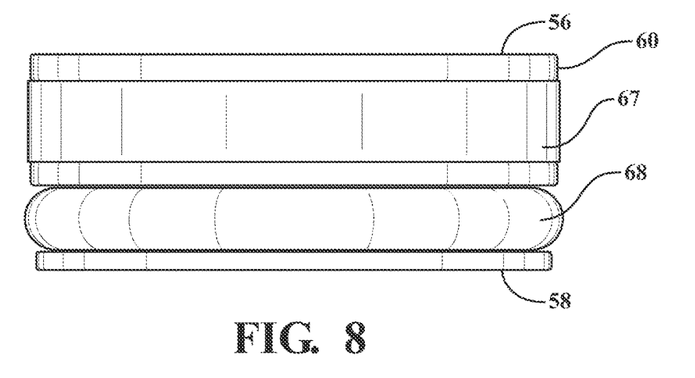
FIG. 8 is a left side view of the gas cup wherein a right side view is a mirror image of the left side view.
Figure 9:
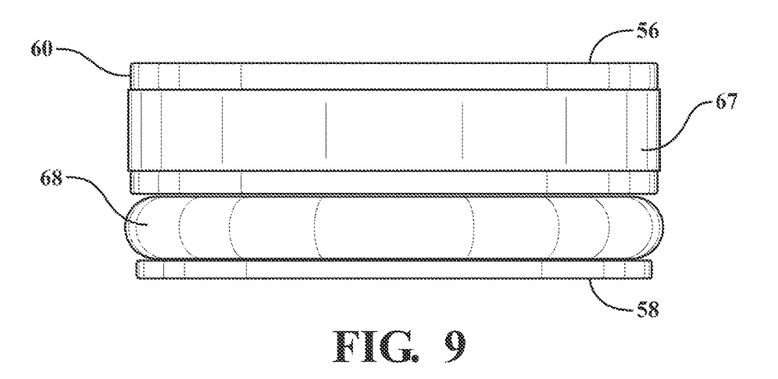
FIG. 9 is a front view of the gas cup.
Figure 10:
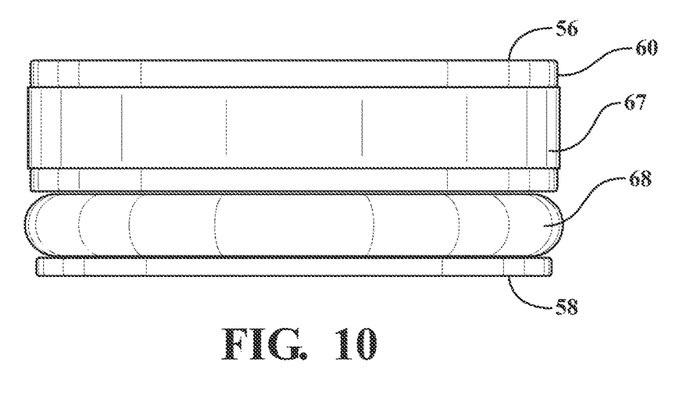
FIG. 10 is a rear view of the gas cup.

As best illustrated in FIG. 2, the damper assembly 20 comprises a housing 34, having a generally cylindrical shape, disposed on a center axis A and extending between an opened end 42 and a closed end 44. The housing 34 defines a space 36, 38, 40 extending along the center axis A between the opened end 42 and the closed end 44 for containing a working fluid. A mounting ring 46, having a generally circular shape, couples to the closed end 44 for securing the housing 34 to the vehicle.

A piston 48, having a generally cylindrical shape, slidably disposed in the space 36, 38, 40 dividing the space 36, 38, 40 into a compression chamber 36, 38 and a rebound chamber 40. The compression chamber 36, 38 extends between the closed end 44 and the piston 48. The rebound chamber 40 extends between the opened end 42 and the piston 48.

A gas cup 50 includes a body 52, having a generally cylindrical shape, slidably located in the compression chamber 36, 38 and spaced apart from the piston 48. The gas cup 50 divides the compression chamber 36, 38 into a gas compartment 36 and a fluid compartment 38. The gas compartment 36 extends between the closed end 44 and the gas cup 50 for containing a gas. It should be noted that the gas can be pressurized in the gas compartment. The fluid compartment 38 extends between the gas cup 50 and the piston 48 for containing the working fluid. In other words, the gas cup 50 separates the working fluid and the pressurized gas to compensate for the volumetric change in the fluid compartment 38 and the rebound chamber 40 to absorb pressure pulse, damp hydraulic impact, and store energy to provide a damping force. It should be noted that the applications can be included in passive shock absorber, semi-active suspension systems, active suspension systems, hydraulic pump, actuator, and accumulator which operates with fluids such as oil and water.

As best shown in FIGS. 3-10, the body 52 defines an aperture 54 extending along the center axis A and through the body 52 to allow fluid communication between the gas compartment 36 and the fluid compartment 38. The body 52 includes an upper surface 56, a lower surface 58, an exterior surface 60, and an interior surface 62. The upper surface 56 faces the piston 48. The lower surface 58 faces the closed end 44. The exterior surface 60 extends between the upper surface 56 and the lower surface 58 and annularly about the center axis A facing the housing 34. The interior surface 62 is radially spaced from the exterior surface 60 extending between the upper surface 56 and the lower surface 58 and annularly about the center axis A to define the aperture 54. The exterior surface 60 defines a pair of grooves 64, 66 including an upper groove 64 and a lower groove 66. The upper groove 64 and the lower groove 66 are axially spaced apart from one another extending annularly about the body 52. The upper groove 64 is located adjacent to the upper surface 56. The lower groove 66 is located adjacent to the lower surface 58. A guiding ring 67 is located in the upper groove 64 extending about the center axis A for engaging the housing 34. A seal ring 68 is located in the lower groove 66 extending about the center axis A and in an abutment relationship with the housing 34 for preventing gas in the gas compartment for leaking between the exterior surface 60 of the body 52 and the housing 34.

A decoupler 70, having a generally circular shape, is located in the aperture 54 and secured to the interior surface 62 of the body 52 to separate the gas compartment 36 from the fluid compartment 38 for compensating volumetric fluid change in the fluid compartment 38 and the rebound chamber 40. At least one stopper 72, 74 is located in the aperture 54 coupled to the interior surface 62 for restricting movement of the decoupler 70. The at least one stopper 72, 74 includes an upper stopper 72 and a lower stopper 74. The upper stopper 72 is located adjacent to the upper surface 56 coupled to the interior surface 62 of the body 52 for restricting an axial movement of the decoupler 70 toward the upper surface 56. The lower stopper 74 is located adjacent to the lower surface 58 coupled to the interior surface 62 of the body 52 for restricting an axial movement of the decoupler toward the lower surface 58.

Referring back to FIG. 2, the damper assembly 20 includes a piston rod guide 76 is located in the rebound chamber 40 and adjacent to the opened end 42 of the housing 34. The piston rod guide 76 is in sealing engagement with the opened end 42 of the housing 34 to close the space 36, 38, 40. The piston rod guide 76 defines a bore 78, having a generally cylindrical shape, extending along the center axis A and in communication with the rebound chamber 40.

A piston rod 80, having a generally cylindrical shape, extends along the center axis A, through the bore 78, and into the rebound chamber 40 to a distal end 82. The piston rod 80 couples to the piston 48 for moving the piston 48 in the space 36, 38, 40 between a compression stroke and a rebound stroke. The compression stroke is defined as the piston rod 80 and the piston 48 move towards the closed end 44. The rebound stroke is defined as the piston rod 80 and the piston 48 move toward the opened end 42. A projection 84 extends outwardly from the distal end 82 of the piston rod 80 and through the piston 48 to a terminal end 86, spaced part from the piston 48, to couple the piston 48 to the piston rod 80. The piston 48 defines a hole 88, having a generally cylindrical shape, extending along the center axis A and receiving the projection 84 to allow the projection 84 to extend through the piston 48. A retaining member 90 is disposed at the terminal end 86 coupled to the projection 84 to secure the piston 48 to the piston rod 80.

The piston 48 has a compression surface 92 and a rebound surface 94. The compression surface 92 is located in the compression chamber 36, 38 facing the closed end 44. The rebound surface 94 is located in the rebound chamber 40 facing the opened end 42. The piston 48 defines a plurality of channels 96, 98 for allowing the working fluid to flow through the piston 48 during the compression stroke and the rebound stroke. The plurality of channels 96, 98 includes a set of compression channels 96 and a set of rebound channels 98 extending through the piston 48 for allowing the working fluid to flow through the piston 48 during the compression stroke and the rebound stroke. The set of compression channels 96, located adjacent to an outer surface 100 of the piston 48, is disposed about the center axis A and circumferentially spaced from one another. The compression channels 96 extend from the compression surface 92 to the rebound surface 94 in a parallel relationship with the center axis A. The set of rebound channels 98, radially spaced apart from the set of compression channels 96 extends from the compression surface 92 to the rebound surface 94 parallel to the center axis A.

A compression valve 102 includes a plurality of discs, each having a generally circular shape, disposed on the rebound surface 94 of the piston 48 covering the set of compression channels 96 for limiting working fluid flow through the piston 48 during the compression stroke to provide a damping force during the compression stroke. A rebound valve 104 includes a plurality of discs, each having a generally circular shape, disposed on the compression surface 92 covering the rebound channels 98 for limiting working fluid flow through the piston 48 during the rebound stroke to provide a damping force during the rebound stroke.

Referring back to FIGS. 3-10, a bridging member 106 is located between the decoupler 70 and the interior surface 62 of the body 52 coupled to the decoupler 70 and the body 52 to secure the decoupler 70 to the body 52. The decoupler 70 and the bridging member 106 are made from materials having different elasticity to allow the decoupler 70 to move in the aperture 54 in response to a volumetric change in the damper assembly 20 and to provide variable tuning of the damper assembly 20. For example, the decoupler 70 can be made from a rigid material and the bridging member 106 can be made from an elastic material to allow the decoupler 70 to move in the aperture 54 in response to the volumetric change in the fluid compartment 38 and the rebound chamber 40.

According to an embodiment of the present invention, the decoupler 70 can be made from a lightweight rigid material while the bridging member 106 can be made from an elastomeric material. In other words, the flexible material used in the gas cup 50 is the bridging member 106. According to an embodiment of the present invention, the decoupler 70 may not entirely comprise of an elastomeric material. For example, the center of the decoupler 70 can be thin aluminum plate wherein engineered rubber/elastomeric material can be bonded to an outer edge of the aluminum plate for movement and component travel. It should be noted that rubber/elastomeric material's shape and compound can be key to the decoupler's 70 functionality and durability. With this arrangement, the present invention significant reduces potential gas loss/leak in the gas compartment 36 due to the gas permeability characteristics of a decoupler 70 of a conventional gas cup which is made entirely from an elastomeric material. According to an embodiment of the present invention, the bridging member 106 extends radially inwardly from the interior surface 62 toward the center axis to a bridging member end 108. The bridging member end 108 is coupled to the decoupler 70. According to an embodiment of the present invention, bridging member end 108 defines a slot 110 extending annularly about the center axis A and the decoupler 70 is received in the slot 110.

The upper stopper 72 extends radially inwardly toward the center axis A having an arcuate shaped cross-section with a first curvature whereby the first curvature of the upper stopper 72 matches a deformation of the bridging member 106 toward the upper surface 56 of the body 52. The lower stopper 74 extends radially inwardly toward the center axis A and having an arcuate shaped cross-section with a second curvature whereby the second curvature of the lower stopper 74 matches a deformation of the bridging member 106 toward the lower surface 58 of the body 52. In other words, the uniquely shaped stoppers 72, 74 are installed adjacent to both upper and lower sides of the decoupler 70. According to an embodiment of the present invention, the stoppers 72, 74 can be made of rigid material and securely positioned in the gas cup 50. The primary purpose of the stoppers 72, 74 is to limit the axial movement of the bridging member 106 and the decoupler 70 and to protect the bridging member 106 and the decoupler 70 from being overstretched during the compression stroke and the rebound stroke. It should be appreciated that the first curvature of the upper stopper 72 and a second curvature of the lower stopper 74 are designed to match the deformed shape of the bridging member 106 even after the decoupler 70 contacts the stoppers 72, 74 this is because the working fluid pressure can continue to apply to the bridging member 106. Accordingly, this arrangement can be used when the gas cup 50 needs to temporarily support charged gas pressure until fluid is filled in the fluid compartment 38 and the rebound chamber 40 wherein the fluid compartment 38 and the rebound chamber 40 and the gas compartment 36 reach equilibrium pressure. Without the curvature, the bridging member 106 can be overstretched until it bottoms out the stoppers 72, 74 and thereby, reducing the operational life of the damper assembly 20.

The interior surface 62 of the body 52 defines an upper recess 111 and a lower recess 112. The upper recess 111 is located in the fluid compartment 38 and adjacent to the upper surface 56 of the body 52 and extending annularly about the center axis A for receiving the upper stopper 72 and secure the upper stopper 72 to the interior surface 62 of the body 52. The lower recess 112 is located in the gas compartment 36 extending annularly about the center axis A for receiving the lower stopper 74 and secure the lower stopper to the interior surface of the body 52. In other words, the upper stopper 72 and the lower stopper 74 are installed in the upper and lower side of the decoupler 70. The stoppers 72, 74 can be made of rigid material and securely positioned in the gas cup 50. The main purpose of the stoppers 72, 74 is to protect rubber bridge being overstretched during the operation. According to an embodiment of the present invention, an inner diameter of the stoppers 72, 74 are smaller than a diameter of the decoupler 70 whereby the decoupler 70 movement in both axial directions are restricted once the decoupler 70 contact stoppers 72, 74. The bridging member 106 is designed to provide certain stiffness to meet a specific application requirements wherein the gas cup 50 will move in the compression chamber 36, 38 before the disc fully contacts the stoppers 72, 74. In the event of extreme conditions such as high-speed input, the axial movement of the decoupler 70 is restricted by the stoppers 72, 74 to prevent the bridging member 106 from being overstretched.

The bridging member 106, the decoupler 70, and the stoppers 72, 74 also offer variable tuning options for the gas cup 50 and the damping assembly 20 to improve ride comfort of the user. For instance, during the operation of the damper assembly 20, a force of greater than 8N during the compression stroke or rebound stroke can move the gas cup 50 inside the housing 34. As the gas cup 50 slides in the housing 34, the gas cup 50 is able to provide an additional damping force to compensate for the volumetric change in the housing 34 caused by the compression stroke and the rebound stroke. In the event that the force is less than 8N, i.e. when the vehicle is traveling on a smooth road, the bridging member 106, the decoupler 70, and the stoppers 72, 74 can provide the damping force to compensate for the small volumetric change in the housing 34 caused by the compression stroke and the rebound stroke.

According to an embodiment of the present invention, the tuning can be achieved by varying the elasticity of the bridging member 106 and/or the decoupler 70. For example, to increase the axial movement of the bridging member 106 and/or the decoupler 70, a more elastic material can be used to form the bridging member 106 and/or the decoupler 70. This arrangement allows the bridging member 106 and the decoupler 70 to compensate for greater volumetric changes in the housing 34 caused by the compression stroke and the rebound stroke, i.e. when vehicle is traveling on a rougher road. On the other hand, to reduce the axial movement of the bridging member 106 and/or the decoupler 70, the bridging member 106 and/or the decoupler 70 can be made from a less elastic material. This arrangement allows the bridging member 106 and the decoupler 70 to compensate for a smaller volumetric change in the housing 34, i.e. when vehicle is traveling on a smoother road.

Additionally, the tuning of the gas cup 50 can be achieved by varying the distances of the stoppers 72, 74 relative to the bridging member 106 and the decoupler 70. In other words, the upper stopper 72 and the lower stopper 74 are independently movable relative to the bridging member 106 and the decoupler 70 to adjust the amplitude of the axial movement of the bridging member 106 and the decoupler 70. For example, to restrict the axial movement of the bridging member 106 and the decoupler 70, the stoppers 72, 74 can be closer to the bridging member 106 and the decoupler 70. On the other hand, to increase the axial movement of the bridging member 106 and the decoupler 70, the upper stopper 72 and the lower stopper 74 can be axially spaced apart from the bridging member 106 and the decoupler 70. In summary, the tuning of the gas cup 50 can be achieved by varying three different parameters, e.g. the material composition of the decoupler 70, the material composition of the bridging member 106, and/or the distance of the stoppers 72, 74 relative to the bridging member 106 and the decoupler 70. These arrangements offer different tuning options for the gas cup 50 and the damper assembly 20.

The upper stopper 72 defines a first orifice 114 bounded by a first periphery 116. The first orifice 114 is in fluid communication with the fluid compartment 38. According to an embodiment of the present invention, the first periphery 116 of the first orifice 114 extends sinusoidally and annularly about the center axis A. According to an embodiment of the present invention, the first periphery 116 defines a plurality of first peaks 118 and a plurality of first troughs 120 disposed about the center axis A. The lower stopper 74 defines a second orifice 122 bounded by a second periphery 124. The second orifice 122 is in fluid communication with the gas compartment 36. According to an embodiment of the present invention, the second periphery 124 of the second orifice 122 extending sinusoidally and annularly about the center axis A. According to an embodiment of the present invention, the second periphery 124 defines a plurality of second peaks 126 and a plurality of second troughs 128 located about the center axis A. In other words, the first orifice 114 and the second orifice 122 both can have a flower shape. The flower shape is employed to maximize fluid flow into the gas cup 50 to help improve response to the pressure fluctuation while limiting the movement of the bridging member 106.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims.

What is claimed is:

1. A gas cup for a damper assembly comprising:
    a body including an upper surface, a lower surface, an exterior surface and an interior surface;
    said body defining an aperture extending through said upper surface and said lower surface;
    a decoupler located in said aperture and secured to said body; and
    a bridging member located between said decoupler and said body and coupled to said decoupler and said body, said decoupler and said bridging member being made from materials having different elasticity to allow said decoupler to move in said aperture in response to a volumetric change in the damper assembly and to provide variable tuning of the damper assembly,
    wherein the gas cup further includes at least one stopper located in said aperture and coupled to said interior surface for restricting movement of said decoupler,
    wherein said at least one stopper includes an upper stopper and a lower stopper, said upper stopper being located adjacent to said upper surface and coupled to said body for restricting an axial movement of said decoupler toward said upper surface; and
    said lower stopper being located adjacent to said lower surface and coupled to said body for restricting an axial movement of said decoupler toward said lower surface,
    wherein said upper stopper defines a first orifice bounded by a first periphery, said first periphery extends about a center axis and includes at least one first peak and at least one first trough.

2. The gas cup according to claim 1, wherein said decoupler is made from a rigid material and said bridging member is made from an elastomeric material.

3. The gas cup according to claim 1, wherein said decoupler includes an aluminum plate with an elastomeric material bonded to an outer edge of said aluminum plate.

4. The gas cup according to claim 1, wherein said bridging member extends radially inwardly from said interior surface toward a center axis to a distal end, said distal end of said bridging member being coupled to said decoupler.

5. The gas cup according to claim 4, wherein said distal end of said brigading member defines a slot extending annularly about said center axis, said decoupler being received in said slot.

6. The gas cup according to claim 1, wherein said upper stopper has an arcuate shaped cross-section having a first curvature whereby said first curvature matches a deformation of said bridging member toward said upper surface.

7. The gas cup according to claim 6, wherein said lower stopper has an arcuate shaped cross-section having a second curvature whereby said second curvature matches a deformation of said bridging member toward said lower surface.

8. The gas cup according to claim 1, wherein said first periphery of said first orifice extending sinusoidally about a center axis.

9. The gas cup according to claim 8, wherein said lower stopper defines a second orifice bounded by a second periphery, said second periphery of said second orifice extending sinusoidally about said center axis.

10. The gas cup according to claim 1, wherein said lower stopper defines a second orifice bounded by a second periphery, said second periphery extends about said center axis and includes at least one second peak and at least one second trough.

11. A damper assembly comprising:
    a housing extending along a center axis between an opened end and a closed end defining a space extending therebetween;
    a piston slidably disposed in said space dividing said space into a compression chamber and a rebound chamber;
    a piston rod guide located in said rebound chamber in sealing engagement with said opened end;
    a piston rod extending into said rebound chamber and coupled to said piston for moving said piston in said space between a compression stroke and a rebound stroke;

a gas cup including a body slidably located in said compression chamber dividing said compression chamber into a gas compartment and a fluid compartment;

said body including an upper surface, a lower surface, an exterior surface and an interior surface;

said body defining an aperture extending through said upper surface and said lower surface;

a decoupler located in said aperture and secured to said body; and a bridging member located between said decoupler and said body and coupled to said decoupler and said body, said decoupler and said bridging member being made from materials having different elasticity to allow said decoupler to move in said aperture in response to a volumetric change in the damper assembly and to provide variable tuning of the damper assembly, wherein the damper assembly further includes at least one stopper located in said aperture and coupled to said interior surface for restricting movement of said decoupler, wherein said at least one stopper includes an upper stopper and a lower stopper, said upper stopper being located adjacent to said upper surface and coupled to said interior surface of said body for restricting an axial movement of said decoupler toward said upper surface; and said lower stopper being located adjacent to said lower surface and coupled to said interior surface of said body for restricting an axial movement of said decoupler toward said lower surface, wherein said upper stopper defines a first orifice bounded by a first periphery, said first periphery extends about said center axis and includes at least one first peak and at least one first trough.

12. The damper assembly according to claim 11, wherein said decoupler is made from a rigid material and said bridging member is made from an elastomeric material.

13. The damper assembly according to claim 12, wherein said decoupler includes an aluminum plate with an elastomeric material bonded to an outer edge of said aluminum plate.

14. The damper assembly according to claim 11, wherein said bridging member extends radially inwardly from said interior surface toward said center axis to a distal end, said distal end of said bridging member being coupled to said decoupler.

15. The damper assembly according to claim 14, wherein said distal end of said bridging member defines a slot extending annularly about said center axis, said decoupler being received in said slot.

16. The damper assembly according to claim 11, wherein said upper stopper has an arcuate shaped cross-section having a first curvature whereby said first curvature of said upper stopper matches a deformation of said bridging member toward said upper surface of said body.

17. The damper assembly according to claim 16, wherein said lower stopper has an arcuate shaped cross-section having a second curvature whereby said second curvature of said lower stopper matches a deformation of said bridging member toward said lower surface of said body.

18. The damper assembly according to claim 17, wherein said lower stopper defines a second orifice bounded by a second periphery, said second periphery of said second orifice extending sinusoidally and annularly about said center axis; and wherein said lower stopper defines a second orifice bounded by a second periphery, said second periphery extends about said center axis and includes at least one second peak and at least one second trough.

19. The damper assembly according to claim 11, wherein said upper stopper defines a first orifice bounded by a first periphery, said first periphery of said first orifice extending sinusoidally about said center axis.

* * * * *